United States Patent
Woo et al.

(10) Patent No.: US 9,234,663 B2
(45) Date of Patent: Jan. 12, 2016

(54) HEAT PUMP SUPPLY APPARATUS HAVING A COMBINED USE WITH AN AIR CONDITIONER

(75) Inventors: Hyoungsuk Woo, Changwon-si (KR); Jongchul Ha, Changwon-si (KR)

(73) Assignee: LG Electronics Inc., Seoul (KR)

(*) Notice: Subject to any disclaimer, the term of this patent is extended or adjusted under 35 U.S.C. 154(b) by 477 days.

(21) Appl. No.: 13/163,420

(22) Filed: Jun. 17, 2011

(65) Prior Publication Data
US 2012/0111032 A1 May 10, 2012

(30) Foreign Application Priority Data
Nov. 5, 2010 (KR) .................. 10-2010-0110008

(51) Int. Cl.
*F25B 29/00* (2006.01)
*F25B 27/00* (2006.01)
*F25B 13/00* (2006.01)
(Continued)

(52) U.S. Cl.
CPC ............ *F24D 17/02* (2013.01); *F24D 19/1054* (2013.01); *F24F 3/065* (2013.01); *F24F 5/0096* (2013.01); *F24H 4/02* (2013.01); *F25B 13/00* (2013.01); *F24D 2200/31* (2013.01); *Y02B 30/12* (2013.01)

(58) Field of Classification Search
CPC .............. Y02B 30/12; F25B 2313/023; F25B 2313/0231; F25B 13/00; F25B 49/022; F25B 49/025; F25B 2400/00; F25B 2600/02; F25B 2600/021; F25B 2600/024; F25B 2600/025; F25B 2700/151; F25B 2700/2106; F25B 2700/21161; F24D 17/02; F24D 19/1054; F24H 4/02; F24F 5/0096
USPC ......... 62/159, 160, 331, 175, 238.6, 333, 335
See application file for complete search history.

(56) References Cited

U.S. PATENT DOCUMENTS

| | | |
|---|---|---|
| 3,564,865 A | 2/1971 | Spencer et al. |
| 4,594,858 A | 6/1986 | Shaw |

(Continued)

FOREIGN PATENT DOCUMENTS

| | | |
|---|---|---|
| CN | 101163925 A | 4/2008 |
| EP | 2244037 | 10/2010 |

(Continued)

OTHER PUBLICATIONS

Korean Office Action dated May 25, 2012 for Application 10-2010-0107805.

(Continued)

*Primary Examiner* — Frantz Jules
*Assistant Examiner* — Steve Tanenbaum
(74) *Attorney, Agent, or Firm* — KED & Associates LLP

(57) ABSTRACT

A hot water supply apparatus for combined use with an air conditioner is provided that may include an indoor unit having an indoor heat exchanger to heat exchange a first refrigerant with indoor air, and a cascade hot water heater connected to the indoor unit to receive the first refrigerant and to provide a second refrigerant to heat water. The cascade hot water heater may perform a heat exchange between the first refrigerant and a second refrigerant. The cascade hot water heater may include a capacity variable compressor to limit a maximum flowing amount of the second refrigerant and increase a flowing amount of the first refrigerant to flow to the indoor unit.

3 Claims, 3 Drawing Sheets

(51) Int. Cl.
  *F25B 15/00* (2006.01)
  *F25B 7/00* (2006.01)
  *F24D 17/02* (2006.01)
  *F24D 19/10* (2006.01)
  *F24F 3/06* (2006.01)
  *F24F 5/00* (2006.01)
  *F24H 4/02* (2006.01)

(56) References Cited

U.S. PATENT DOCUMENTS

| | | | |
|---|---|---|---|
| 5,161,386 A * | 11/1992 | Higuchi | 62/160 |
| 6,293,123 B1 | 9/2001 | Iritani et al. | |
| 6,829,903 B2 | 12/2004 | Lee et al. | |
| 8,074,459 B2 | 12/2011 | Murakami et al. | |
| RE43,121 E | 1/2012 | Peterson | |
| 8,181,470 B2 | 5/2012 | Narayanamurthy et al. | |
| 8,640,475 B2 | 2/2014 | Park et al. | |
| 2004/0118135 A1 | 6/2004 | Lee et al. | |
| 2004/0144528 A1* | 7/2004 | Kunimoto | F24D 17/02 165/298 |
| 2007/0012053 A1* | 1/2007 | Eisenhower | F24H 4/04 62/183 |
| 2007/0017240 A1 | 1/2007 | Shapiro | |
| 2009/0049855 A1* | 2/2009 | Murata et al. | 62/259.1 |
| 2010/0025488 A1 | 2/2010 | Park et al. | |
| 2010/0050675 A1* | 3/2010 | Kameyama et al. | 62/238.7 |
| 2010/0243202 A1* | 9/2010 | Han et al. | 165/62 |
| 2010/0282434 A1* | 11/2010 | Yabuuchi et al. | 165/63 |
| 2010/0282435 A1* | 11/2010 | Yabuuchi et al. | 165/63 |
| 2010/0326107 A1 | 12/2010 | Honma et al. | |
| 2011/0016897 A1* | 1/2011 | Akagi et al. | 62/161 |
| 2011/0113808 A1 | 5/2011 | Ko et al. | |
| 2011/0283725 A1 | 11/2011 | Sim | |
| 2011/0283726 A1* | 11/2011 | Sim | 62/160 |
| 2011/0289952 A1 | 12/2011 | Kim et al. | |
| 2011/0314848 A1* | 12/2011 | Tanaka | F25B 13/00 62/126 |
| 2012/0042678 A1 | 2/2012 | Park et al. | |
| 2012/0060551 A1 | 3/2012 | Takayama et al. | |
| 2012/0111032 A1 | 5/2012 | Woo et al. | |
| 2012/0111050 A1 | 5/2012 | Jang et al. | |
| 2012/0222440 A1* | 9/2012 | Matsui et al. | 62/159 |
| 2012/0285188 A1 | 11/2012 | Honda | |
| 2012/0297806 A1 | 11/2012 | Honda | |
| 2013/0227979 A1 | 9/2013 | Kasuka et al. | |
| 2013/0269379 A1 | 10/2013 | Ue et al. | |

FOREIGN PATENT DOCUMENTS

| | | |
|---|---|---|
| JP | 01256762 | 10/1989 |
| JP | 04263758 | 9/1992 |
| JP | 2001-074319 | 3/2001 |
| JP | 2005-061784 | 3/2005 |
| JP | 2006-200888 | 8/2006 |
| JP | 2007-093043 | 4/2007 |
| KR | 10-1988-0004283 | 6/1988 |
| KR | 10-2006-0098263 | 9/2006 |
| KR | 10-2006-0100795 | 9/2006 |
| WO | WO 2010/098607 | 9/2010 |
| WO | WO 2010113372 A1 * | 10/2010 |

OTHER PUBLICATIONS

Office Action dated Oct. 30, 2013 for co-pending U.S. Appl. No. 13/163,441.
English translation of JP 2005-061784 A, published Mar. 10, 2005.
U.S. Office Action issued in co-pending U.S. Appl. No. 13/163,393 dated Dec. 15, 2014.
U.S. Notice of Allowance issued in U.S. Appl. No. 13/163,393 dated Apr. 1, 2015.
U.S. Office Action for co-pending U.S. Appl. No. 13/163,393 dated Apr. 10, 2014.
U.S. Office Action dated Jul. 2, 2013, issued in U.S. Appl. No. 13/163,441.

* cited by examiner

HEAT PUMP SUPPLY APPARATUS HAVING A COMBINED USE WITH AN AIR CONDITIONER

CROSS-REFERENCE TO RELATED APPLICATION

This application claims priority from Korean Application No. 10-2010-0110008, filed Nov. 5, 2010, the subject matter of which is incorporated herein by reference.

BACKGROUND

1. Field

Embodiments of the present invention may relate to a hot water supply apparatus for a combined use with an air conditioner. More particularly, embodiments of the present invention may relate to a hot water supply apparatus for a combined use of an air conditioner and a cascade hot water heater.

2. Background

A hot water supply apparatus is an apparatus for generating hot water by heating water using heating equipment, such as a boiler or the like.

A heat pump type hot water supply apparatus may heat water using a cooling cycle of a compressor, a condenser, an expander and an evaporator, and an refrigeration and heat pump apparatus having a low-pressure side heating cycle and a high-pressure side heating cycle so as to heat water in a storage tank using different types of refrigerants.

In a refrigeration and heat pump apparatus according to disadvantageous arrangements, a problem may occur in that when not only the high-pressure side heating cycle but also an indoor unit for performing air conditioning on a room space are connected to the low-pressure side heating cycle, and refrigerant is concentrated in the high-pressure side heating cycle, thereby degrading the air-conditioning performance of the indoor unit.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments may be described in detail with reference to the accompanying drawings.

Figure 1:
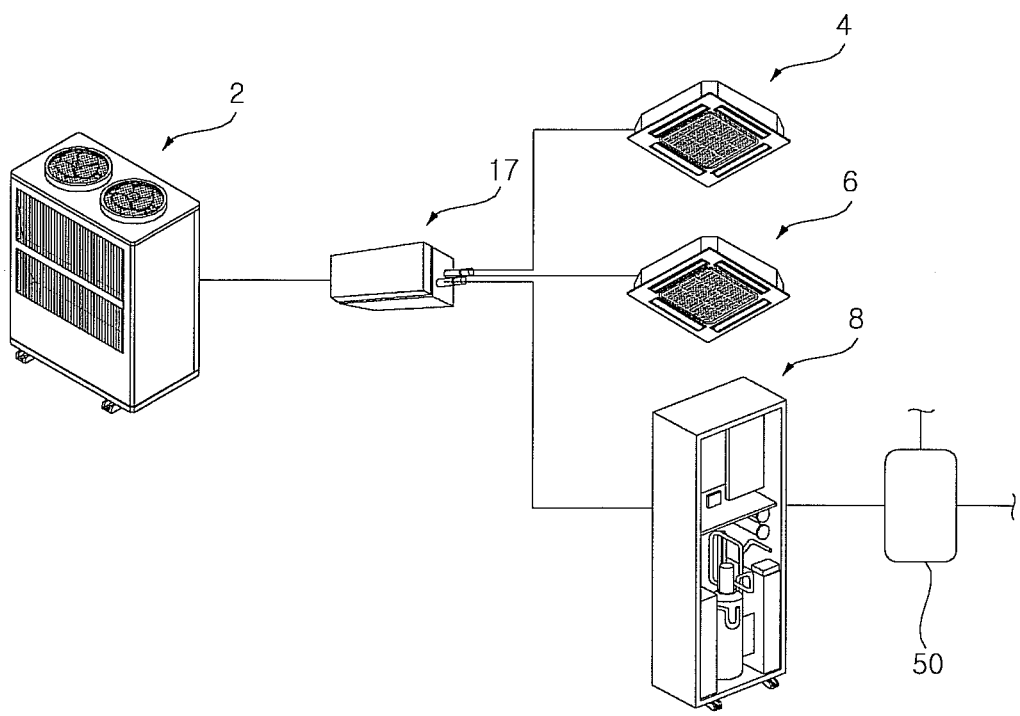
FIG. 1 is a diagram showing a configuration of a hot water supply apparatus for a combined use with an air conditioner according to an example embodiment of the present invention.
Figure 2:
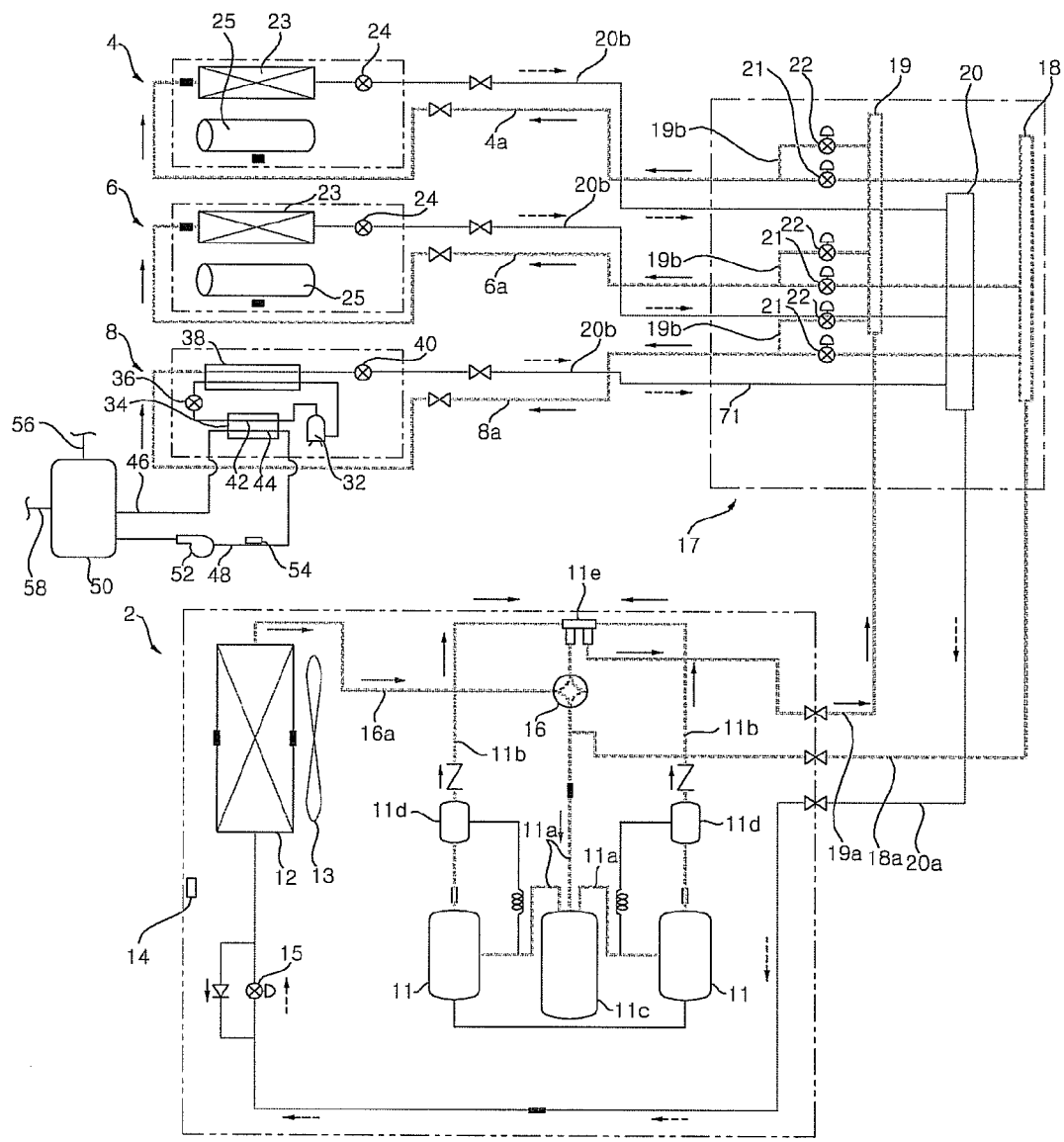
FIG. 2 is a diagram showing a refrigerant flow and a water flow of a hot water supply apparatus for a combined use with an air conditioner according to an example embodiment of the present invention.

FIG. 1 is a diagram showing a configuration of a hot water supply apparatus for a combined use with an air conditioner according to an example embodiment of the present invention. FIG. 2 is a diagram showing a refrigerant flow and a water flow of a hot water supply apparatus for a combined use with an air conditioner according to an example embodiment of the present invention. Other embodiments and configurations may also be provided.

A hot water supply apparatus for a combined use with an air conditioner may include an outdoor unit 2, a plurality of indoor units 4 and 6 and a cascade hot water heater 8. A heat recovery unit 17 may also be provided. The plurality of indoor units 4 and 6 may air condition room spaces, and the cascade hot water heater 8 may generate hot water.

The plurality of indoor units 4 and 6 and the cascade hot water heater 8 may operate separately or may operate simultaneously depending on an indoor air conditioning load and a hot water heating load. The indoor units 4 and 6 may operate regardless of operation of the cascade hot water heater 8 or, the cascade hot water heater 8 may operate simultaneously with all or some of the indoor units 4 and 6, or separately.

If the plurality of indoor units includes a first indoor unit 4 and a second indoor unit 6, the outdoor unit 2 may operate when there is any one of the air conditioning load of the first indoor unit 4, the air conditioning load of the second indoor unit 6 and the hot water heating load of the cascade hot water heater 8. In this example, when there is the air conditioning load of the first indoor unit 4, the first indoor unit 4 may operate. When there is the air conditioning load of the second indoor unit 6, the second indoor unit 6 may operate. When there is the hot water heating load, the cascade hot water heater 8 may operate.

The outdoor unit 2 may include a compressor 11 in which a first refrigerant is compressed and an outdoor heat exchanger 12 in which the first refrigerant is heat-exchanged with outdoor air. The compressor 11 may be coupled to a compressor suction passage 11a through which the first refrigerant is introduced into the compressor 11, and a compressor discharge passage 11b through which the first refrigerant compressed by the compressor 11 is discharged. An accumulator 11c, in which liquid refrigerant is stored, may be provided in the compressor suction passage 11a. An oil separator 11d, which separates oil from the refrigerant discharged from the compressor 11 and recovers the oil to the compressor 11, may be provided in the compressor discharge passage 11b. The outdoor unit 2 may further include an outdoor fan 13 that blows outdoor air to the outdoor heat exchanger 12, and an outdoor temperature sensor 14 that detects an outdoor temperature. An outdoor expansion valve 15, which expands the first refrigerant toward the outdoor heat exchanger 12, may be provided in the outdoor unit 2. The outdoor expansion valve 15 may be implemented using an electronic expansion valve, such as a LEV, an EEV, or the like, having an adjustable opening degree.

The outdoor unit 2 and the plurality of indoor units 4 and 6 may selectively operate for both heating and cooling. A heating-cooling switch valve 16 may be provided in the outdoor unit 2 to adjust flow of the refrigerant upon heating or cooling. The heating-cooling switch valve 16 may be respectively coupled to the compressor suction passage 11a and the compressor discharge passage 11b. The heating-cooling switch valve 16 may be respectively coupled to the outdoor heat exchanger 12 and an outdoor heat exchanger connection passage 16a. A discharge distributor 11e may be provided in the compressor discharge passage 11b. The discharge distributor 11e may distribute the refrigerant compressed by the compressor 11 to the heating-cooling switch valve 16 and the heat recovery unit 17 (HR unit) that may be described below.

The plurality of indoor units 4 and 6 and the cascade hot water heater 8 may be connected to the outdoor unit 2 through a liquid tube or a branch tube, or the plurality of indoor units 4 and 6 and the cascade hot water heater 8 may be connected to the outdoor unit 2 through the heat recovery unit 17.

When the plurality of indoor units 4 and 6 and the cascade hot water heater 8 are connected to the outdoor unit 2 through a liquid tube or a branch tube, the refrigerant passages of the liquid tube may be provided in parallel and the refrigerant passages of the branch tube may be provided in parallel. The first refrigerant discharged from the outdoor unit 2 may be distributed and supplied to the plurality of indoor units 4 and 6 and the cascade hot water heater 8, and the first refrigerant discharged from the plurality of indoor units 4 and 6 and the cascade hot water heater 8 may be collected and then supplied to the outdoor unit 2.

When the plurality of indoor units 4 and 6 and the cascade hot water heater 8 are connected to the outdoor unit 2 by the heat recovery unit 17, the first refrigerant discharged from the plurality of indoor units 4 and 6 and the first refrigerant discharged from the cascade hot water heater 8 may flow to the outdoor unit 2 through the heat recovery unit 17 (HR unit), and the first refrigerant discharged from the outdoor unit 2 may flow to the plurality of indoor units 4 and 6 and the cascade hot water heater 8 through the heat recovery unit 17.

The heat recovery unit 17 may include a low pressure gas pipe 18. The low pressure gas pipe 18 may be connected to the outdoor unit 2, and more particularly may be connected to the compressor discharge passage 11a and the low pressure branch tube 18a. The low pressure gas pipe 18 may be connected to the plurality of outdoor units 4 and 6 respectively, and to the indoor branch tube 4a, 6a and 8a.

The heat recovery unit 17 may include a high-pressure pipe 19. The high-pressure pipe 19 may be connected to the outdoor unit 2, and more particularly may be connected to the discharge distributor 11e and the high-pressure branch tube 19a. The high-pressure gas pipe 19 may be connected to the indoor branch tubes 4a, 6a and 8a, and a branch tube 19b, respectively.

The heat recovery unit 17 may include a liquid pipe 20. The liquid pipe 20 may be connected to the outdoor unit 2 through a liquid tube 20a. The liquid pipe 20 may be connected to the indoor liquid tube 20b, which is respectively connected to the plurality of outdoor units 4 and 6 and the cascade hot water heater 8.

The heat recovery unit 17 may include a low-pressure valve 21 and a high-pressure valve 22. The low-pressure valve 21 is provided in (or mounted to) the indoor branch tubes 4a, 6a and 8a so as to control the flow of the refrigerant between the plurality of indoor units 4 and 6, the cascade hot water heater 8 and the low-pressure gas pipe 18. The low-pressure valve 21 is configured to have an adjustable opening degree. The high-pressure valve 22 is provided in (or mounted to) in the branch tube 19b to control the flow of the refrigerant between the plurality of indoor units 4 and 6, the cascade hot water heater 8 and the high-pressure gas pipe 19. The high-pressure valve 22 is configured to have an adjustable opening degree. The heat recovery unit 17 may allow the low-pressure valve 21 and the high-pressure valve 22 to be controlled based on operations of the plurality of indoor units 4 and 6 and the cascade hot water heater 8. When the plurality of indoor units 4 and 6 are used for cooling, the heat recovery unit 17 may flow low-temperature refrigerant to the plurality of indoor units 4 and 6. When the plurality of indoor units 4 and 6 are used for heating, the heat recovery unit 17 may flow high-temperature refrigerant to the plurality of indoor units 4 and 6 and flow high-temperature refrigerant to the cascade hot water heater 8.

The plurality of indoor units 4 and 6 may perform air-conditioning on room spaces by performing a heat-exchange between the first refrigerant and indoor air. The plurality of indoor units 4 and 6 respectively have indoor heat-exchangers 23 in which a heat exchange is performed between the first refrigerant and indoor air. The plurality of indoor units 4 and 6 respectively may have indoor expansion valves 24. The indoor expansion valve 24 may control an amount of the refrigerant flowing to the indoor heat-exchanger 23. The indoor expansion valve 24 may be implemented using an electronic expansion valve, such as a LEV, an EEV, or the like, having an adjustable opening degree. In the plurality of indoor units 4 and 6, when an opening degree of the indoor expansion valve 24 is controlled to have a high value, an amount of the refrigerant introduced into the indoor heat-exchanger 23 may increase, and when an opening degree of the indoor expansion valve 24 is controlled to have a low value, an amount of the refrigerant introduced into the indoor heat-exchanger 23 may decrease. The plurality of indoor units 4 and 6 may further respectively include indoor fans 25 that flow indoor air to the indoor heat-exchanger 23.

The cascade hot water heater 8 may be connected to operate simultaneously with the plurality of indoor units 4 and 6. The first refrigerant is heat-exchanged with a second refrigerant, and the second refrigerant may heat water. The cascade hot water heater 8 may include a capacity variable compressor 32 that compresses the second refrigerant, a water refrigerant heat exchanger 34 in which the second refrigerant compressed by the capacity variable compressor 32 is condensed by heating water, an expander 36 to expand the second refrigerant condensed in the water refrigerant heat exchanger 34, and a cascade heat exchanger 38 in which the second refrigerant expanded in the expander 36 is heat-exchanged with the first refrigerant and the second refrigerant is then evaporated.

The capacity variable compressor 32 may include an inverter compressor in which a working capacity varies based on an input frequency, or the like. The flowing amount may vary of the second refrigerant that is circulated through the capacity variable compressor 32, the water refrigerant heat exchanger 34, the expander 36 and the cascade heat exchanger 38.

The water refrigerant heat exchanger 34 may include a condensing passage 42 through which the second refrigerant is condensed by passing therethrough, and a water passage 44 through which water is heated by passing therethrough. The water refrigerant heat exchanger 34 may be a plate shaped heat exchanger in which the condensing passage 42 and the water passage 44 are arranged alternately with a heat transfer member interposed therebetween. The water refrigerant heat exchanger 34 may be configured by a double tube heat exchanger having a double tube structure in which any one of the condensing passage 42 and the water passage 44 surrounds the other one. The water refrigerant heat exchanger 34 may be configured by a shell-tube heat exchanger having a shell through which any one of the second refrigerant and the water passes therethrough, and a plurality of tubes through which the other one of the second refrigerant and the water passes and which is located inside the shell. The water refrigerant heat exchanger 34 may be connected to a water inlet passage 46 through which water is introduced into the water passage 44 of the water refrigerant heat exchanger 34 and a water outlet passage 48 through which water is discharged from the water passage 44 of the water refrigerant heat exchanger 34.

The hot water supply apparatus for a combined use with an air conditioner may further include a hot water tank 50 to store water. The hot water tank 50 and the water refrigerant heat exchanger 34 may be connected to the water inlet passage 46 and the water outlet passage 48. A water pump 52 may be provided in (or mounted at) one of the water inlet passage 46 and the water outlet passage 48. The water pump 52 may flow the water of the hot water tank 50 to the water passage 44 of the water refrigerant heat exchanger 34, and then recover water to the hot water tank 50. An outlet water temperature sensor 54, which detects the temperature of water discharged from the water refrigerant heat exchanger 46, may be provided at (or mounted at) the water outlet passage 48. The hot water tank 50 may be connected to a water inlet 56 and a water outlet 58. Water fed from an external water source may be introduced into the hot water tank 50 through the water inlet 56. The water within the hot water tank 50 may be discharged to locations where hot water is required, for example, a hot water supply unit (e.g. a shower), a floor heating tube (or bottom heating tube) provided at a bottom of a room or the like, through the water outlet 58.

The expander 36 may be implemented using an electronic expansion valve, such as a LEV, an EEV, or the like, having an adjustable opening degree.

The cascade heat exchanger 38 may allow the first refrigerant to condense and the second refrigerant to evaporate by allowing heat of the first refrigerant to be transferred to the second refrigerant. The cascade heat exchanger 38 may include a first refrigerant passage through which the first refrigerant passes and a second refrigerant passage through which the second refrigerant passes. The cascade heat exchanger 38 may be a plate shaped heat exchanger, a double tube heat exchanger or a shell-tube heat exchanger.

The cascade hot water heater 8 may further include an expansion valve to control an amount of the first refrigerant flowing to the cascade heat exchanger 38.

The cascade hot water heater 8 may allow a flowing amount of the second refrigerant flowing to the water refrigerant heat exchanger 34 to decrease when a frequency input to the capacity variable compressor 32 is lowered, thereby decreasing the flowing amount of the first refrigerant flowing to the cascade hot water heater 8. The cascade hot water heater 8 may allow the flowing amount of the second refrigerant to increase when a frequency input to the capacity variable compressor 32 increases, thereby increasing the flowing amount of the first refrigerant flowing to the cascade hot water heater 8. That is, the cascade hot water heater 8 can control a heating ability of the plurality of indoor units 4 and 6 and a water heating ability of the cascade hot water heater 8 based on a frequency input to the capacity variable compressor 32.

In an example where an outdoor temperature is low and then the heating ability of the plurality of indoor units 4 and 6 is degraded, if the frequency of the capacity variable compressor 32 increases, a subcooling degree having a cascade cycle formed by the capacity variable compressor 32, the water refrigerant heat exchanger 34, the expander 36 and the cascade heat exchanger 38 may decrease. In an example where the outdoor temperature is low and then the heating ability of the plurality of indoor units 4 and 6 is degraded, if the opening degree of the cascade expansion valve 40 is lowered to be identical to a setting opening degree, the flowing amount of the first refrigerant introduced into the cascade heat exchanger 38 decreases, whereas the flowing amount of the first refrigerant introduced into the indoor units 4 and 6 increases thereby improving the heating ability.

When the cascade hot water heater 8 is connected to an end branch having a longest flow distance, the flowing amount of the first refrigerant flowing to the cascade hot water heater 8 may be small due to the flow distance of the refrigerant. In this example, when the frequency of the capacity variable compressor 32 is lowered, the subcooling degree having the cascade cycle that is formed by the capacity variable compressor 32, the water refrigerant heat exchanger 34, the expander 36 and cascade heat exchanger 38 may increase, and when the opening degree of the cascade expansion valve 40 increases to be identical to a setting opening degree, the flowing amount of the first refrigerant introduced into the cascade heat exchanger 38 may decrease, thereby minimizing a phenomenon in which a lack of the first refrigerant occurs due to connection of the cascade hot water heater 8 to the end branch.

The capacity variable compressor 32 may have a maximum frequency (Hz max) of an input current. The capacity variable compressor 32 may adjust a current to be input to the capacity variable compressor 32 to be identical to a setting frequency (hereafter referred to as a maximum input frequency Hz max) that is lower than the maximum frequency when a condition in which there is lack of the first refrigerant flowing to the plurality of indoor units 4 and 6, or the like. When the maximum frequency (Hz max) is adjusted to be the maximum input frequency, the capacity variable compressor 32 may operate at less than its working capacity corresponding to the maximum input frequency (Hz max'). In this example, the flowing amount of the second refrigerant circulating the cascade hot water heater 8 is smaller than an example in which the capacity variable compressor 32 may operate at its working capacity corresponding to the maximum frequency (Hz max). That is, the maximum input frequency (Hz max') is lower than the maximum frequency (Hz max), and is a frequency modified or again set at the maximum frequency. For example, assuming that the maximum frequency (Hz max) of the capacity variable compressor 32 is 100 Hz, the maximum input frequency (Hz max') to be input to the capacity variable compressor 32 may be adjusted to be 70 Hz lower than the maximum frequency (Hz max), and the capacity variable compressor 32 may allow the flowing amount of the second refrigerant to decrease than that of in the example in which the maximum frequency (Hz max) is input. The flowing amount of the first refrigerant flowing to the cascade hot water heater 8 may also decease correspondingly and the first refrigerant, of which the amount is larger than that of the example in which the maximum frequency (Hz max) is input to the capacity variable compressor 32, may be allowed to flow to the plurality of indoor units 4 and 6.

The cascade hot water heater 8 may limit a maximum flowing amount of the second refrigerant to increase the flowing amount of the first refrigerant flowing to the plurality of indoor units 4 and 6. The cascade hot water heater 8 may control the maximum input frequency (Hz max') of the capability variable compressor 32 in order to limit the maximum flowing amount of the second refrigerant.

The cascade hot water heater 8 may modify the flowing amount of the second refrigerant based on an outdoor temperature, the outlet water temperature of the water refrigerant heat exchanger 34 and working rates of the plurality of indoor units 4 and 6 and the cascade hot water heater 8.

The outdoor temperature is a temperature detected by the outdoor temperature sensor 14 and the outlet water temperature of the water refrigerant heat exchanger 34 is a temperature detected by the outlet water temperature sensor 54. The working rate of the plurality of indoor units 4 and 6 and the cascade hot water heater 8 may be calculated based on operation and stopping of the plurality of indoor units 4 and 6 and the cascade hot water heater 8. For example, when the plurality of indoor units include the first indoor unit 4 and the second indoor unit 6, the first indoor unit 4 may be 30% of an overall working rate, the second indoor unit 6 may be 30% of the overall working rate and the cascade hot water heater 8 may be 40% of the overall working rate. In this example, the working rate in which the first and second indoor units 4 and 6 and the cascade hot water heater 8 are all operated is 100% (overall operation). In this example, the working rate in which one of the first and second indoor units 4 and 6 and the cascade hot water heater 8 are operated is 70%. The working rate in which only the cascade hot water heater 8 operates is 40%. The working rate may be various combinations based on operation and stopping of the plurality of indoor units 4 and 6 and the cascade hot water heater 8.

As the outdoor temperature Tout is lowered, the capacity variable compressor 32 is adjusted to have the lower maximum input frequency (Hz max').

As the outlet water temperature Twt of the water refrigerant heat exchanger 34 is higher, the capacity variable compressor 32 is adjusted to have the higher maximum input frequency (Hz max').

As the working rate of the indoor units 4 and 6 and the cascade hot water heater 8 is lowered, the capacity variable compressor 32 is adjusted to have the higher maximum input frequency (Hz max').

The maximum input frequency (Hz max') may be determined based on the maximum frequency (Hz max) of the capacity variable compressor 32, a first reference value (Kodt) determined based on a range of the outdoor temperature, a second reference value (Kwt) determined based on a range of the outlet water temperature of the water refrigerant heat exchanger 34, and a third reference value (Kcapa) determined based a the working rate of the plurality of indoor units 4 and 6 and the cascade hot water heater 8.

The maximum input frequency (Hz max') may be defined based on Equation 1.

$$Hzmax' = Hzmax \times Kodt \times Kwt \times Kcapa \quad \text{[Equation 1]}$$

The first reference value Kodt may be set based on the following Table

TABLE 1

| Outdoor Temperature (Tout) | Kodt |
| --- | --- |
| Outdoor Temperature > A° C. | D |
| A° C. ≥ Outdoor Temperature > B° C.(B° C. < A° C.) | E(E < D) |
| B° C. ≥ Outdoor Temperature > C° C.(C° C. < B° C.) | F(F < E) |

The second reference value Kwt may be set based on the following Table 2.

TABLE 2

| Outlet water temperature (Twt) | Kwt |
| --- | --- |
| Outlet water temperature > G° C. | L |
| G° C. ≥ Outlet water temperature > H° C.(H° C. < G° C.) | M(M < L) |
| H° C. ≥ Outlet water temperature > I° C.(I° C. < H° C.) | O(O < M) |
| I° C. ≥ Outlet water temperature > J° C.(J° C. < I° C.) | P(P < O) |
| J° C. ≥ Outlet water temperature > K° C.(K° C. < J° C.) | Q(Q < P) |

The third reference value Kcapa may be set based on the following Table 3.

TABLE 3

| Working Rate | more than 50%-100% | less than 50% |
| --- | --- | --- |
| Kcapa | R | S(S > R) |

As described above, the first reference value Kodt may be respectively set for the respective temperature ranges of the outdoor temperature, and the second reference value Kwt may be respectively set for the respective temperature ranges of the outlet water temperature. Further, the third reference value may be respectively set based on the working rate of the plurality of outdoor units 4 and 6 and the cascade hot water heater 8. The maximum input frequency (Hz max') may be determined by applying the first reference value Kodt, the second reference value Kwt and the third reference value Kcapa to Equation 1.

The frequency to be input to the capacity variable compressor 32 may be modified based on the water heating load, and the maximum input frequency thereof may be limited to the frequency determined by Equation 1. In this example, a phenomenon in which the first refrigerant is concentrated in the cascade hot water heater 8 when the plurality of outdoor units 4 and 6 and the cascade hot water heater 8 are operated simultaneously. Further, the degrading may be minimized (or reduced) of heating by the plurality of indoor units 4 and 5 that may occur when the first refrigerant is concentrated in the cascade hot water heater 8.

The hot water supply apparatus for a combined use of an air conditioner may further include a controller for controlling the maximum input frequency of the capacity variable compressor 32 based on the outdoor temperature detected by the outdoor temperature sensor 14, the water temperature detected by the outlet water temperature sensor 54, and the working rate of the plurality of indoor units 4 and 6 and the cascade hot water heater 8.

When the cascade hot water heater 8 is operated, the outdoor temperature sensor 14 may detect the outdoor temperature and output the detected outdoor temperature to a controller. The outlet water temperature sensor 54 may detect the water temperature and output the detected water temperature to the controller. The controller may calculate the working rate of the plurality of indoor units 4 and 6 and the cascade hot water heater 8 based on whether the plurality of indoor units 4 and 6 are operated or stopped. The controller may adjust the maximum input frequency of the capacity variable compressor 32 using the calculated working rate, the outdoor temperature detected by the outdoor temperature sensor 14, and the water temperature detected by the outlet water temperature sensor 54.

Figure 3:
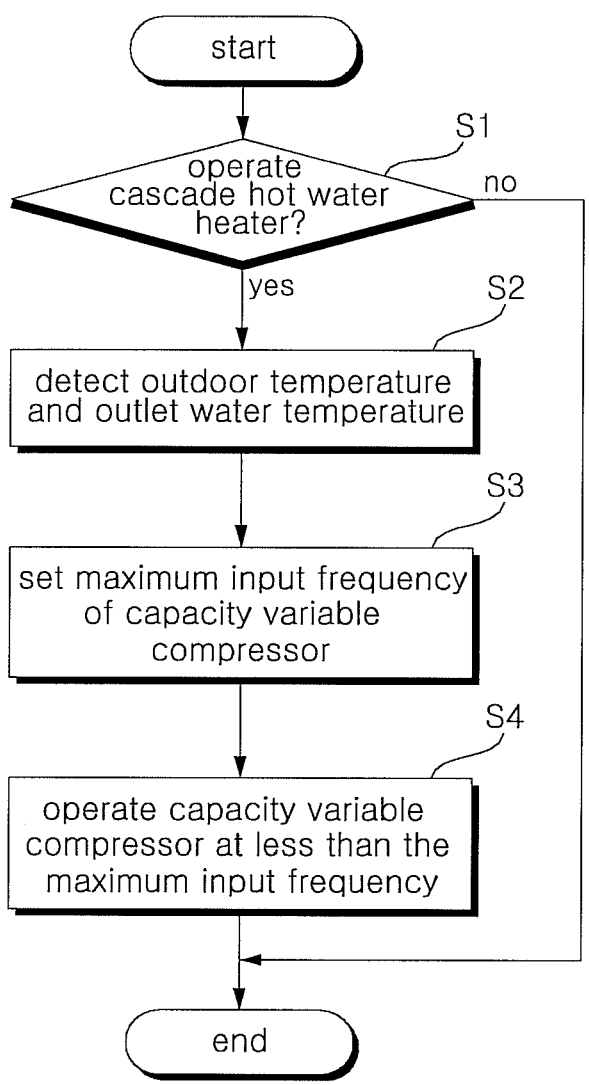
FIG. 3 is a flowchart showing a method for operating a hot water supply apparatus for a combined use with an air conditioner according to an example embodiment of the present invention.

FIG. 3 is a flowchart showing a method for operating a hot water supply apparatus for a combined use of an air conditioner according to an example embodiment of the present invention. Other operations, orders of operations and embodiments may also be provided.

A method of operating the hot water supply apparatus for a combined use of an air conditioner may include temperature detection operations S1 and S2.

The temperature detection operations S1 and S2 may be performed when the cascade hot water heater 8 is operated due to a water heating load, and the outdoor temperature and the outlet water temperature of the water refrigerant heat exchanger 34 may be detected upon operation of the cascade hot water heater 8. Upon operation of the cascade hot water heater 8, the capacity variable compressor 32 may operate and the compressor 11 of the outdoor unit 2 may operate. In this example, the plurality of indoor units 4 and 6 may operate or stop based on an air-conditioning load. The refrigerant compressed by the compressor 11 of the outdoor unit 2 may flow only to the cascade hot water heater 8 or may be distributed and flow to any one of the cascade hot water heater 8 and the plurality of indoor units 4 and 6. In this example, the outdoor temperature sensor 14 may detect the outdoor temperature and output the detected outdoor temperature to the controller, and the outlet water temperature sensor 54 may detect water temperature and output the detected water temperature to the controller.

The method of operating the hot water supply apparatus for a combined use of an air conditioner may include flowing amount modification operations S3 and S4.

The flowing amount modification operations S3 and S4 may modify the flowing amount of the second refrigerant based on the working rate of the plurality of indoor units 4 and 6 and the cascade hot water heater 8, and the outdoor temperature detected in the temperature detection operations S1 and S2, and the outlet water temperature detected in the temperature detection operations S1 and S2.

The flowing amount modification operations S3 and S4 may include a maximum input frequency setting operation S3 and a capacity variable compressor frequency adjusting operation S4 to modify the flowing amount of the second refrigerant. The maximum input frequency setting operation S3 may set the maximum input frequency (Hz max') to be input to the capacity variable compressor 32 and the capacity variable compressor frequency adjusting operation S4 may enable the capacity variable compressor 32 to operate at less than the maximum input frequency (Hz max').

The maximum input frequency (Hz max') may be determined in proportion to the first reference value set based on the range of the outdoor temperature, the second reference value set based on the range of the outlet water temperature of the water refrigerant heat exchanger and the third reference value set based on the working rate of the plurality of indoor units and the cascade hot water heater. The first reference value may decrease as the outdoor temperature is lowered as shown in Table 1, the second reference value may increase as the outlet water temperature of the water refrigerant heat exchanger is higher as shown in Table 2 and the third reference value may increase as the working rate of the working rate of the plurality of indoor units and the cascade hot water heater is lowered as shown in Table 3.

The maximum input frequency (Hz max') may be determined to be a frequency resulting from multiplication of the maximum frequency of the capacity variable compressor 32 and the first reference value, the second reference value and the third reference value. When the maximum input frequency (Hz max') has been determined, a frequency less than the maximum input frequency (Hz max') may be input to the capacity variable compressor 32.

When the maximum input frequency (Hz max') is set, the flowing amount of the first refrigerant flowing to the plurality of indoor units 4 and 6 may be larger than an example in which the capacity variable compressor 32 is operated at a frequency higher than the maximum input frequency (Hz max'), and degrading of heating by the plurality of indoor units 4 and 5 may be prevented (or reduced).

Embodiments of the present invention may have advantages.

A refrigerant balance between the plurality of indoor units and the cascade hot water heater may be ensured, and degrading of the air-conditioning ability of the plurality of indoor units due to operation of the cascade hot water heater may be minimized.

The flowing amount of refrigerant flowing to the cascade hot water heater or the indoor units may be controlled by modifying the maximum input frequency to be input to the cascade compressor.

The outdoor temperature, the water refrigerant heat exchanger and the working rate of the cascade hot water heater and the plurality of indoor units may be used, thereby adjusting an optimal amount of refrigerant for the cascade hot water heater and the plurality of indoor units.

Embodiments of the present invention may provide a hot water supply apparatus for a combined use of an air conditioner that allows refrigerant to be sufficiently supplied to an indoor unit when a cascade hot water heater (i.e., a high-pressure side heating cycle) is connected to the indoor unit to operate simultaneously.

A hot water supply apparatus for a combined use of an air conditioner may include: an indoor heat exchanger in which first refrigerant is heat-exchanged with indoor air; and a cascade hot water heater connected to the indoor unit to operate simultaneously in which the first refrigerant is heat-exchanged with a second refrigerant, and the second refrigerant is used to heat water. The cascade hot water heater may limit a maximum flowing amount of the second refrigerant to increase a flowing amount of refrigerant flowing into the indoor unit.

The cascade hot water heater may include a capacity variable compressor that compresses the second refrigerant, a water refrigerant heat exchanger in which the second refrigerant compressed by the capacity variable compressor is condensed by heating water, an expander in which the second refrigerant condensed in the water refrigerant heat exchanger is expanded, and a cascade heat exchanger in which the second refrigerant expanded in the expander is heat-exchanged with the first refrigerant and is then evaporated.

The cascade hot water heater may adjust a maximum input frequency of a cascade compressor so as to limit the maximum flowing amount of the second refrigerant.

The indoor unit and the cascade hot water heater may be connected to an outdoor unit through a liquid tube and/or a branch tube.

The indoor unit and the cascade hot water heater may be connected to an outdoor unit through a heat recovery unit.

A hot water supply apparatus for a combined use of an air conditioner may include: an outdoor unit having a compressor in which first refrigerant is compressed and an outdoor heat exchanger in which the first refrigerant is heat-exchanged with outdoor air; a plurality of indoor units connected to the outdoor unit and having an indoor heat exchanger in which the first refrigerant is heat-exchanged with indoor air; and a cascade hot water heater connected to the plurality of indoor units in which the first refrigerant is heat-exchanged with a second refrigerant. The cascade hot water heater may include a capacity variable compressor that compresses the second refrigerant, a water refrigerant heat exchanger in which the second refrigerant compressed by the capacity variable compressor is condensed by heating water, an expander in which the second refrigerant condensed in the water refrigerant heat exchanger is expanded, and a cascade heat exchanger in which the second refrigerant expanded in the expander is heat-exchanged with the first refrigerant and is then evaporated. The cascade hot water heater may modify a flowing amount of the second refrigerant based on an outdoor temperature, an outlet water temperature of the water refrigerant heat exchanger and a working rate of the plurality of indoor units and the cascade hot water heater.

The cascade hot water heater may modify the flowing amount of the second refrigerant by adjusting a maximum input frequency to be input to the capacity variable compressor.

The capacity variable compressor may adjust the maximum input frequency to be lower as the outdoor temperature is lowered. The capacity variable compressor may adjust the maximum input frequency to be higher as the outlet water temperature increases. The capacity variable compressor may adjust the maximum input frequency to be higher as the working rate of the indoor units and the cascade hot water heater is lower.

The hot water supply apparatus for a combined use of an air conditioner may further include: an outdoor temperature sensor for detecting the outdoor temperature; an outlet water temperature sensor for detecting the outlet water temperature of the water refrigerant heat exchanger; and a controller for controlling the capacity variable compressor based on the working rate of the plurality of indoor units and the cascade hot water heater, the outdoor temperature detected by the outdoor temperature sensor and the outlet water temperature detected by the outlet water temperature sensor.

The plurality of indoor units and the cascade hot water heater may be connected to an outdoor unit through a liquid tube and/or a branch tube.

The plurality of indoor units and the cascade hot water heater are connected to an outdoor unit through a heat recovery unit.

A method may be provided for operating a hot water supply apparatus for the combined use of an air conditioner. The method may include a temperature detection operation for detecting the outlet water temperature of the water refrigerant heat exchanger and the outdoor temperature upon operation of the cascade hot water heater. The method may also include a flowing amount modification operation for modifying the flowing amount of the second refrigerant according the working rate of the plurality of indoor units and the cascade hot water heater and the outdoor temperature and the outlet water temperature detected at the temperature detection operation.

The flowing amount modification operation may include a maximum input frequency setting operation for setting the maximum input frequency to be input to the capacity variable compressor, and a capacity variable compressor frequency adjusting operation for enabling the capacity variable compressor to be operated at less than the maximum input frequency.

The maximum input frequency may be in proportion to a first reference value set based on a range of the outdoor temperature, a second reference value set based on a range of the outlet water temperature of the water refrigerant heat exchanger and a third reference value set based on the working rate of the plurality of indoor units and the cascade hot water heater.

The first reference value may decrease as the outdoor temperature decreases.

The second reference value may increase as the outlet water temperature of the water refrigerant heat exchanger increases.

The third reference value may increase as the working rate of the plurality of indoor units and the cascade hot water heater is lowered.

The maximum input frequency may be a frequency resulting from multiplication of the maximum frequency of the capacity variable compressor and the first reference value, the second reference value and the third reference value.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for operating a hot water supply apparatus for combined use with an air conditioner, the hot water supply apparatus including an indoor unit having an indoor heat exchanger to perform a heat exchange between a first refrigerant and indoor air, and a cascade hot water heater to perform a heat exchange between the first refrigerant and a second refrigerant, and the cascade hot water heater includes a capacity variable compressor to control a flowing amount of the second refrigerant and a water refrigerant heat exchanger to heat water based on the second refrigerant, the method comprising:
    detecting the water temperature of the water refrigerant heat exchanger and the outdoor temperature upon operation of the cascade hot water heater; and
    controlling the flowing amount of the second refrigerant based on the detected outdoor temperature, the detected water temperature and the working rate of the indoor unit and the cascade hot water heater,
    wherein controlling the flowing amount of the second refrigerant includes: calculating a maximum input frequency to be input to the capacity variable compressor, and
    operating the capacity variable compressor at less than the calculated maximum input frequency,
    wherein the maximum input frequency is in proportion to calculated based on a first reference value set based on a range of the outdoor temperature, a second reference value set based on a range of the outlet water temperature of the water refrigerant heat exchanger and a third reference value set based on the working rate of the plurality of indoor units and the cascade hot water heater; wherein the maximum input frequency is a frequency resulting from a calculation that involves multiplication of a maximum frequency of the capability variable compressor and the first reference value, the second reference value and the third reference value.

2. The method of claim 1, wherein the working rate is a percentage of an overall working rate at the indoor units and the cascade hot water heater.

3. A method for operating a hot water supply apparatus, the hot water supply apparatus including an indoor unit and a cascade hot water heater, the indoor unit having an indoor heat exchanger to perform a heat exchange between a first refrigerant and indoor air, and the cascade hot water heater to perform a heat exchange between the first refrigerant and a second refrigerant, and the cascade hot water heater includes a capacity variable compressor to control a flowing amount of the second refrigerant and a water refrigerant heat exchanger to heat water based on the second refrigerant, the method comprising:

detecting an outdoor temperature upon operation of the cascade hot water heater;

detecting a water temperature of the water refrigerant heat exchanger upon operation of the cascade hot water heater;

calculating a maximum input frequency to the capacity variable compressor based on the detected outdoor temperature, the detected water temperature and working rate of the indoor unit and the cascade hot water heater, wherein the working rate is a percentage of an overall working rate, wherein the maximum input frequency is calculated based on a first reference value set based on the detected outdoor temperature, a second reference value set based on the detected water temperature of the water refrigerant heat exchanger and a third reference value set based on the working rate of the indoor unit and the cascade hot water heater; and operating the capacity variable compressor at less than the calculated maximum input frequency; wherein the maximum input frequency is a frequency resulting from a calculation that involves multiplication of a maximum frequency of the capability variable compressor and the first reference value, the second reference value and the third reference value.

* * * * *